(12) United States Patent
Lipson et al.

(10) Patent No.: US 7,519,257 B2
(45) Date of Patent: Apr. 14, 2009

(54) WAVEGUIDE STRUCTURE FOR GUIDING LIGHT IN LOW-INDEX MATERIAL

(75) Inventors: Michal Lipson, Ithaca, NY (US); Carlos Angulo Barrios, Toledo (ES); Vilson Rosa de Almeida, Sao Jose dos Campos (BR); Roberto R. Panepucci, Miami, FL (US); Qianfan Xu, Ithaca, NY (US)

(73) Assignee: Cornell Research Foundation, Inc., Ithaca, NY (US)

( * ) Notice: Subject to any disclaimer, the term of this patent is extended or adjusted under 35 U.S.C. 154(b) by 0 days.

(21) Appl. No.: 11/287,159

(22) Filed: Nov. 25, 2005

(65) Prior Publication Data

US 2006/0228074 A1    Oct. 12, 2006

Related U.S. Application Data

(60) Provisional application No. 60/631,053, filed on Nov. 24, 2004.

(51) Int. Cl.
*G02B 6/00* (2006.01)
(52) U.S. Cl. ............... 385/126; 385/132
(58) Field of Classification Search ............. 385/126, 385/132; 65/385, 386
See application file for complete search history.

(56) References Cited

U.S. PATENT DOCUMENTS

| | | | |
|---|---|---|---|
| 4,049,413 A | 9/1977 | French | |
| 5,265,177 A | 11/1993 | Cho et al. | |
| 5,426,717 A | 6/1995 | Bindloss et al. | |
| 5,585,957 A | 12/1996 | Nakao et al. | |
| 5,657,338 A | 8/1997 | Kitamura | |
| 5,668,900 A | 9/1997 | Little et al. | |
| 5,792,957 A | 8/1998 | Luder et al. | |
| 6,104,738 A | 8/2000 | Kitoh et al. | |
| 6,181,860 B1 | 1/2001 | Granestrand et al. | |
| 6,229,947 B1 | 5/2001 | Vawter et al. | |
| 6,233,375 B1 | 5/2001 | Lang et al. | |

(Continued)

FOREIGN PATENT DOCUMENTS

EP          0810454        12/1997

(Continued)

OTHER PUBLICATIONS

Almeida, V.R., Xu, Q., Barrios, C., Lipson, M., "Guiding and confining ligh in void nanostructure", Optics Letter, vol. 29, No. 11, 1209 (Jun. 1, 2004).*

(Continued)

*Primary Examiner*—Charlie Peng
(74) *Attorney, Agent, or Firm*—Schwegman, Lundberg & Woessner, P.A.

(57) ABSTRACT

A high-index-contrast waveguide structure material used to guide light through a low-refractive-index material. In one embodiment, the waveguide structures are capable of guiding and confining light in such a way that very high optical intensity is obtained in a small cross-sectional area or gap filled with any material with sufficiently low refractive index, relative to the remainder of the structure. The structure may be used to form resonators, optical couplers, directional optical couplers and other optical devices. Structures may be formed consistent with integrated circuit forming processes.

38 Claims, 7 Drawing Sheets

U.S. PATENT DOCUMENTS

| | | | |
|---|---|---|---|
| 6,253,015 | B1 | 6/2001 | Ukrainczyk |
| 6,310,995 | B1 | 10/2001 | Saini et al. |
| 6,498,873 | B1 | 12/2002 | Chandrasekhar et al. |
| 6,697,551 | B2 | 2/2004 | Lee et al. |
| 6,845,204 | B1 * | 1/2005 | Broeng et al. ............... 385/126 |
| 7,184,632 | B2 * | 2/2007 | de Almeida et al. ........... 385/50 |
| 2002/0118916 | A1 | 8/2002 | Lee et al. |
| 2003/0044118 | A1 | 3/2003 | Zhou et al. |
| 2003/0081902 | A1 | 5/2003 | Blauvelt et al. |
| 2004/0037497 | A1 | 2/2004 | Lee |
| 2004/0071403 | A1 | 4/2004 | Lipson et al. |

FOREIGN PATENT DOCUMENTS

| | | |
|---|---|---|
| EP | 0826988 | 3/1998 |
| JP | 55-115002 | 9/1980 |
| JP | 62-145208 | 6/1987 |
| JP | 2000-235125 | 8/2000 |
| WO | WO-01/57565 | 8/2001 |
| WO | WO-02/10815 | 2/2002 |
| WO | WO-03062883 A2 | 7/2003 |

OTHER PUBLICATIONS

Xu, Q., Almeida, V.R., Panepucci, R.R., Lipson, M., "Experimental demonstration of guiding and confining light in nanometer-size low-refractive index material", Optics Letters, vol. 29, No. 14, 1626 (Jul. 15, 2004).*

Almeida, V. R., et al., "Lossless High-Index Contrast Distributed Bragg Reflector", *Proceedings, Conference on Lasers and Electro-Optics (CLEO 2002)*, (2002), 199-200.

Almeida, V. R., "Nanotaper for Compact Mode Conversion", *Optics Letters*, 28(15), (2003), 1302-1304.

Barrios, C. A., "Low-Power-Consumption Short-Length and High-Modulation-Depth Siliicon Electrooptic Modulator", *Journal of Lightwave Technology*, 21(4), (2003), 1089-1098.

Cocorullo, G., et al. , "Fast Infrared Light Modulation in a-Si: H Micro-Devices for Fiber-to-the-Home Applications", *Journal of Non-Crystalline Solids*, 266-269, (2000), 1247-1251.

Fijol, J. J., et al., "Fabrication of Silicon-on-Insulator Adiabatic Tapers for Low Loss Optical Interconnection of Photonic Devices", *Proceedings, International Society of Optical Engineers (SPIE)-Photonics Packaging and Integration*, (Jan. 2003), 14 Pages.

Fritze, M. , et al., "3D Mode Converters For SOI Integrated Optics", *Proceedings of the 2002 IEEE International SOI Conference*, (Oct. 7-10, 2002), 165-166.

Hache, A. , et al., "Ultrafast All-Optical Switching in a Silicon-Based Photonic Crystal", *Applied Physics Letters*, 77(25), (2000), 4089-4091.

Hecht, J. , In: *Understanding Fiber Optics*, (Third Edition), Prentice-Hall, Inc., Upper Saddle River, NJ, (1999), p. 166.

Henari, F. Z., et al., "Third-Order Optical Nonlinearity and All-Optical Switching in Porous Silicon", *Applied Physics Letters*, 67(3), (1995), 323-325.

Ibrahim, T. A., et al., "Alt-Optical Switching in a Laterally Coupled Microring Resonator by Carrier Injection", *IEEE Photonics Technology Letters*, 15(1), (2003), 36-38.

Kasaya, Kazuo, et al., "A Simple Laterally Tapered Waveguide for Low-Loss Coupling to Single-Mode Fibers", *IEEE Photonics Technology Letters*, 5(3), (Mar. 1993), 345-347.

Leonard, S. W., et al., "All-Optical Ultrafast Tuning of Two-Dimensional Silicon Photonic Crystals Via Free-Carrier Injection", *Quantum Electronics and Laser Science Conference (QELS 2001)*, (2001), p. 159.

Manolatou, C. , et al., "Compact Mode-Size Converters For Efficient Coupling Between Fibers And Integrated Optical Waveguides", *Proceedings of the LEOS Summer Topical Meeting*, (Jul. 30-Aug. 1, 2001), 31-32.

Moerman, I. , et al., "A Review on Fabrication Technologies for the Monolithic Integration of Tapers with III-V Semiconductor Devices", *IEEE Journal of Selected Topics in Quantum Electronics*, 3(6), (Dec. 1997), 1308-1320.

Normandin, R. , et al., "All-Optical, Silicon Based, Fiber Optic Modulator Using a Near Cutoff Region", *Canadian Journal of Physics*, 67(4), (1989), 412-419.

Soref, R. A., et al., "Kramers-Koenig Analysis of E-O Switching in Silicon", *Proceedings, International Society of Optical Engineers (SPIE)—Integrated Optical Circuit Engineering IV*, vol. 704, (1986), 32-37.

Stepanov, S. , et al., "Modulation of Light by Light in Silicon-on-Insulator Waveguides", *Applied Physics Letters*, 83(25), (2003), 5151-5153.

Taillaert, Dirk, et al., "A High-Efficiency Out-of-Plane Fibre Coupler For Coupling To High Index Contrast Waveguides", *27th European Conference on Optical Communication, ECOC '01*, vol. 6, (Sep. 30, 2001), 30-31.

Tsang, H. K., et al., "Optical Dispersion, Two-Photon Absorption and Self-Phase Modulation in Silicon Waveguides at 1.5 um Wavelength", *Applied Physics Letters*, 80(3), (2002), 416-418.

Van, V. , et al., "All-Optical Nonlinear Switching in GaAs—AlGaAs Microring Resonators", *IEEE Photonics Technology Letters*, 14(1), (2002), 74-76.

Wada, K. , et al., "On-Chip Interconnection Beyond Semiconductor Roadmap: Silicon Microphotonics", *Proceedings, International Society of Optical Engineers (SPIE)*, vol. 4870, (2002), 437-443.

Zhao, C. Z., et al., "Silicon on Insulator Mach-Zehnder Waveguide Interferometers Operating at 1.3 um", *Applied Physics Letters*, 67(17), 68(12) (*Erratum*), (1995), 2448-2449 and Erratum.

* cited by examiner

WAVEGUIDE STRUCTURE FOR GUIDING LIGHT IN LOW-INDEX MATERIAL

RELATED APPLICATIONS

This application claims priority to U.S. Provisional Application Ser. No. 60/631,053, filed Nov. 24, 2004, which application is incorporated herein by reference.

GOVERNMENT FUNDING

The invention described herein was made with U.S. Government support under Grant Number AFOSR F49620-03-1-0424 awarded by the Air Force Office of Scientific Research. The United States Government has certain rights in the invention.

BACKGROUND

Guiding light in materials with a low refractive index such as air is thought to be prohibited in conventional waveguides, which are based on total internal reflection (TIR). High optical intensity is of foremost importance in many fields of science and technology, due to the innumerous relevant physical phenomena thereby attained, and their immediate applications in sensing, modulation, switching, etc. There is a great scientific and technological interest in achieving high optical intensity in a very small cross-section or volume of matter in order to enable low power integrated devices. Methods and devices providing high optical intensity in a very small cross-section or volume of matter should easily connect with and be compatible with known integrated circuit technologies.

SUMMARY

A high-index-contrast waveguide structure material is used to guide light through a low-refractive-index material. In one embodiment, the waveguide structures are capable of guiding and confining light in such a way that very high optical intensity is obtained in a small cross-sectional area or gap filled with any material with sufficiently low refractive index, relative to the remainder of the structure.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description is, therefore, not to be taken in a limited sense, and the scope of the present invention is defined by the appended claims.

Figure 1:
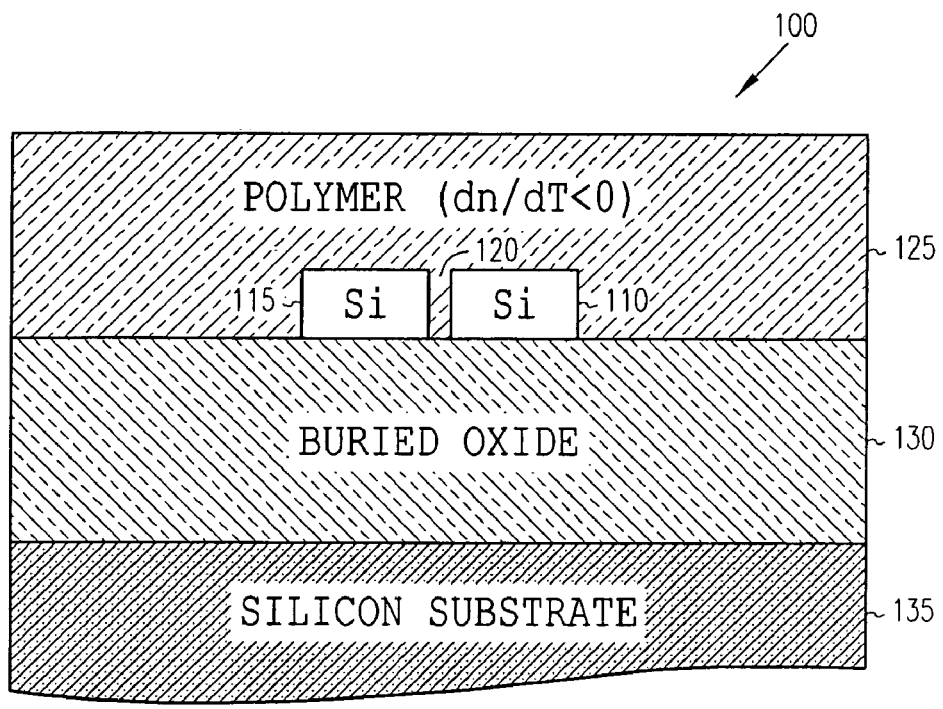
FIG. 1 is a cross-sectional representation of a slot waveguide according to an example embodiment.

FIG. 1 is a cross-sectional representation of one embodiment, of a slot waveguide 100. It is formed from two high refractive index regions 110 and 115 that are formed of silicon in one embodiment. In this embodiment, the silicon regions 110 and 115 are rectangular in cross section, having a width that can be significantly varied. The regions 110 and 115 extend substantially parallel in one embodiment for a desired distance, and are separated by a slot 120 defining a width between the regions in the nanometer range. In one embodiment, slot 120 separates the silicon regions by nanometers. The height of the regions 110 and 115 also defines the height of the slot. Slot 120 may be filled with a low refractive index material, such as a polymer 125, which is also shown as covering the silicon regions 110 and 115 in a layer. In further embodiments, different low refractive index materials, relative to the refractive index of the silicon regions is used, including simply air or other fluid of desired refractive index.

In one embodiment, the silicon regions 110 and 115 are supported by an insulating material such as buried oxide 130, which is further supported on a substrate, such as silicon substrate 135. Other materials providing a contrast in refractive indices may also be utilized without departing from the scope of the invention.

Many different structures, some of which will be described below, may be used that provide a class of waveguide structures capable of guiding and confining light in such a way that very high optical intensity is obtained in a small cross-sectional area filled with any material with sufficiently low refractive index, relative to the remainder core of the structure. While regions 115 and 120 are shown as a rectangular cross section, other shapes, such as triangular or semicircular may also be used to provide suitable surfaces for defining the slot.

The use of materials such as semiconductors, which present relatively high refractive indices, allows for achieving the proper effect in low-refractive-index nanometer-size areas.

In contrast to leaky modes (modes that continually leak their energy to outside the waveguide), the guiding mode of the proposed class of structures are actually eigenmodes. Eigenmodes are fundamentally lossless, and have very low wavelength sensitivity. The structures are not restricted to optical wavelengths, and may work in any wavelength of the electromagnetic spectrum.

The structures provide strong confinement in low-refractive-index materials, which may rely on the discontinuity of the component of the electric field perpendicular to the interface between materials with low and high refractive index. In such a case, the strongest electric field amplitude lies on the material with low refractive index. The structure is designed to keep the magnetic field distribution almost uniform along the material with low refractive index where strong confinement and optical intensity are desired. Therefore, the higher the refractive index contrast, the stronger the electric field discontinuity, thus the stronger the light confinement and optical intensity in the material with low refractive index.

From Maxwell's equations, the normal component of the electric flux density D is continuous at the interface of two dielectric materials. Since $D=\epsilon_r\epsilon_0 E=n^2\epsilon_0 E$, the normal component of electric field E has a discontinuity if the refractive index n is different at opposite sides of the interface. The electric field is then higher at the low-index side and lower at the high-index side, with the ratio equal to the square of the index contrast $(n_{High}/n_{Low})^2$. This discontinuity has usually been overlooked because most of the investigated photonic structures rely on low-index-contrast. However, for high-index-contrast structures, this discontinuity is significant. For example, at an $Si/SiO_2$ interface, the normal component of electric field at the $SiO_2$ side is 6 times higher than that at the Si side. At an Si/air interface, the normal component of the E-field at the air side is 12 times higher than that at the Si side.

Applications for such structures range from non-linear optics, super-continuum generation, optical modulation, optical switching, optical amplification, laser structure, gas sensing, sensing in general, coupling to and from small dimension structures and waveguides, coupling to plasmon waveguides, near-field scanning optical microscopy (NSOM), scanning near-field optical microscopy (SNOM), applications demanding very localized optical intensity or electric field, etc. The scope of applications is not restricted to this list. Similar applications are possible for different wavelength ranges of the electromagnetic spectrum.

Applications may be implemented with relatively low power and high confinement by using a low index material that allows attaining the correspondent functionality. As an example, the use of non-linear optical material as the low refractive index material makes it possible to excite non-linear optical phenomena. Materials to be used as low refractive index material may be among the classes of liquid crystals, rare-earth doped oxides, ferromagnetic materials, ferroelectric materials, polymers, organic materials, gases, liquids, etc.

Slot waveguide 100 has a fairly low dependence on environmental variables such as temperature. For instance, the structure variant referred to as slot-waveguide 100, a thermally suitable material (e.g., some polymer 125) may be used as the low refractive index material that fills a top cladding region and gap (slot 120) between the high refractive index regions 110 and 115. This polymer may possess an appropriate negative thermo-optic coefficient to compensate the aforementioned positive coefficients and the thermal expansion coefficient of the silicon substrate (positive), in such a way that the variation of the optical path of the waveguide with temperature can be made close to zero, that is, the temperature insensitive condition of the waveguide can be satisfied. Since the propagating optical intensity is confined in the slot region, temperature compensation may be easily achieved.

Assuming a silicon-on-insulator (SOI) platform, design parameters are: waveguide geometry and polymer refractive index and thermo-optic coefficient at the operation wavelength. It should be noted that this scheme can be extended to other material systems such as III-V semiconductors, SiGe, SiC, etc. Similar approaches may be implemented for different variants of the structure.

In one embodiment, slot waveguide 100 is fabricated on a silicon-on-insulator (SOI) wafer with a 3-μm buried oxide layer by e-beam lithography patterning, followed by inductively coupled plasma etching and deposition of a 3-μm-thick $SiO_2$ cladding by plasma-enhanced chemical-vapor deposition (PECVD). Example parameters of the waveguide in one embodiment are, width of high refractive index regions 110 and 115, $w_h=220\pm10$ nm, width of slot 120, $w_s=100\pm10$ nm, and height, $h=250\pm10$ nm. At a wavelength around 1.55 μm, the refractive index of the silicon and the silicon oxide are $n_H=3.48$ and $n_C=1.44$, respectively. Because of the low temperature, the narrow slot 120 is not filled with $SiO_2$ in the PECVD process in one embodiment.

Figure 2:
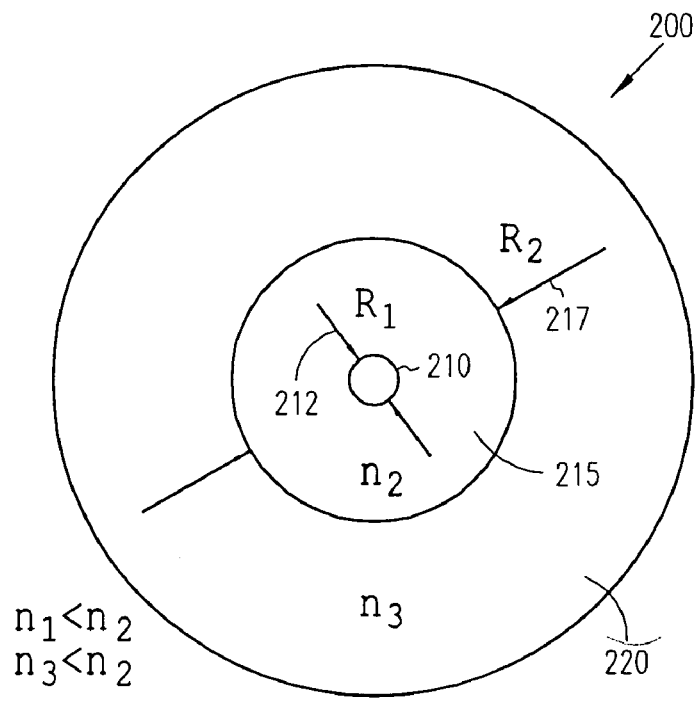
FIG. 2 is a cross-sectional representation of capillary waveguides according to an example embodiment.

The class of structures may be generalized to waveguides in which a high-index region is sandwiched by two low-refractive-index regions. These variants, called capillary waveguides, are those with some closed geometric cross-section, such as rectangular and circular as shown in cross section at 200 in FIG. 2, transverse geometry. Circular capillary waveguide 200 is formed of three materials having different radii. The materials may be concentric. The first material 210 has radius $R_1$ as indicated at 212. The second material 215 surrounds first material 210 and has radius $R_2$ at 217. The third material 220 surrounds the second material, and has a larger radius. The respective refractive indexes of the materials are $n_1$, $n_2$ and $n_3$, where $n_1$ is less than $n_2$ and $n_3$ is less than $n_2$.

Figure 3:
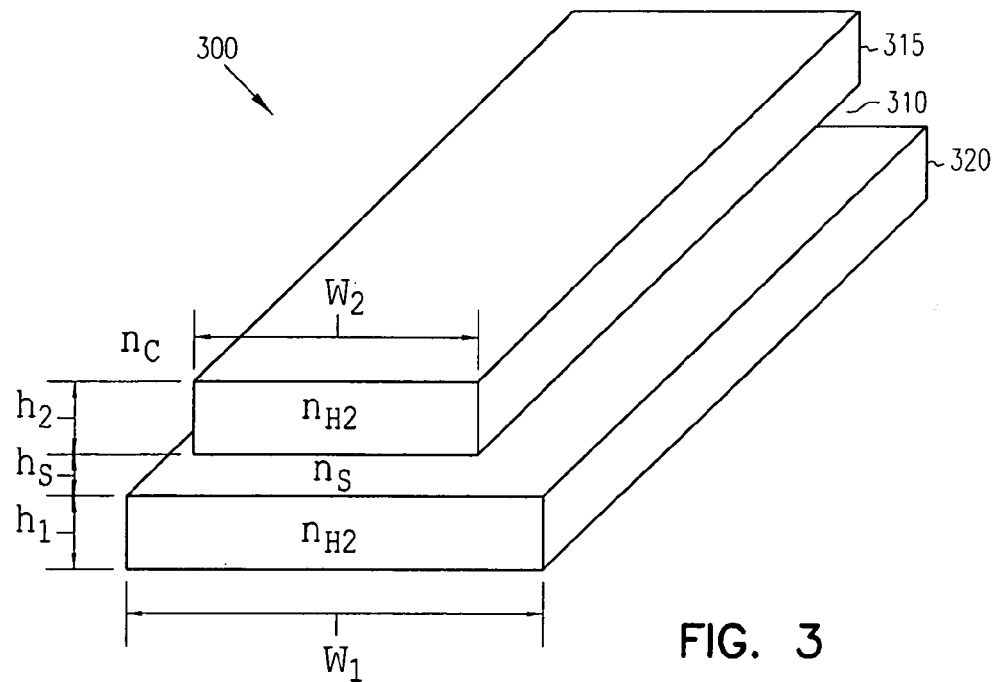
FIG. 3 is a perspective representation of a layered slot-waveguide according to an example embodiment.

Another variant of the proposed class of structures is shown in perspective view in FIG. 3 at 300. In this structure, a narrow low-refractive-index layer 310, which can also be hollow, is sandwiched between two high-refractive-index slabs or layers 315 and 320 having widths of $w_1$ and $w_2$, thicknesses of $h_1$ and $h_2$, and refractive indexes of $n_{H1}$ and $n_{H2}$ respectively. Low-refractive-index layer 310 has a thickness of $h_S$ and refractive index of $n_S$. Structure 300 may be thought of as a layered slot-waveguide, where w's are the width of different layers, h's are the thickness of different layers, and the n's are refractive indices of different layers and an outer cladding, which is not shown for simplicity, but may be formed of various materials, such as SiO2 via plasma enhanced chemical vapor deposition (PECVD) or other methods. The layers may be grown from silicon or other material, using standard integrated circuit processing steps such as e-beam lithography, reactive ion etching (RIE) or other methods as desired.

In one embodiment, the thickness of the low-refractive-index layer 310 is much smaller than the wavelength of the transmitted optical wave in the low-refractive-index material. The thickness of the high-refractive-index layers 315 and 320 is comparable to half of the wavelength in the high-refractive-index material. Some typical parameters are $w_1=500$ nm, $w_2=500$ nm, $h_1=170$ nm, $h_2=170$ nm, $h_S=60$ nm, $n_{H1}=n_{H2}=3.48$, $n_C=1.46$, $n_S=1.46$; or also $w_1=3$ μm, $w_2=500$ nm, $h_1=160$ nm, $h_2=130$ nm, $h_S=60$ nm, $n_{H1}=n_{H2}=3.48$, $n_C=1.46$, $n_S=1.46$. Other set of parameters may also lead to the desired optical confinement and enhancement in the low index material. Typical ranges for $w_1$ and $w_2$ are 200 nanometers to several micrometers, for $h_1$ and $h_2$ are 100 to 400 nanometers. In and $h_2$ should be larger if $n_{H1}$ and $n_{H2}$ are lower, or $w_1$ and $w_2$ are smaller. Other parameter ranges are $h_S$ of 10 to 200 nanometers, or outside that range as well.

In various embodiments, $h_S$ may be smaller if high intensity is preferred and may be larger if more power in the low-index layer is preferred. $h_S$ may be smaller if the difference between $n_H$'s and $n_S$ are larger. $n_{H1}$ and $n_{H2}$ may be larger than 2. $n_S$ should be substantially lower than $n_{H1}$ and $n_{H2}$, so that $n_{H1}/n_S$ and $n_{H2}/n_S$ larger than 1.5.

Figure 4:
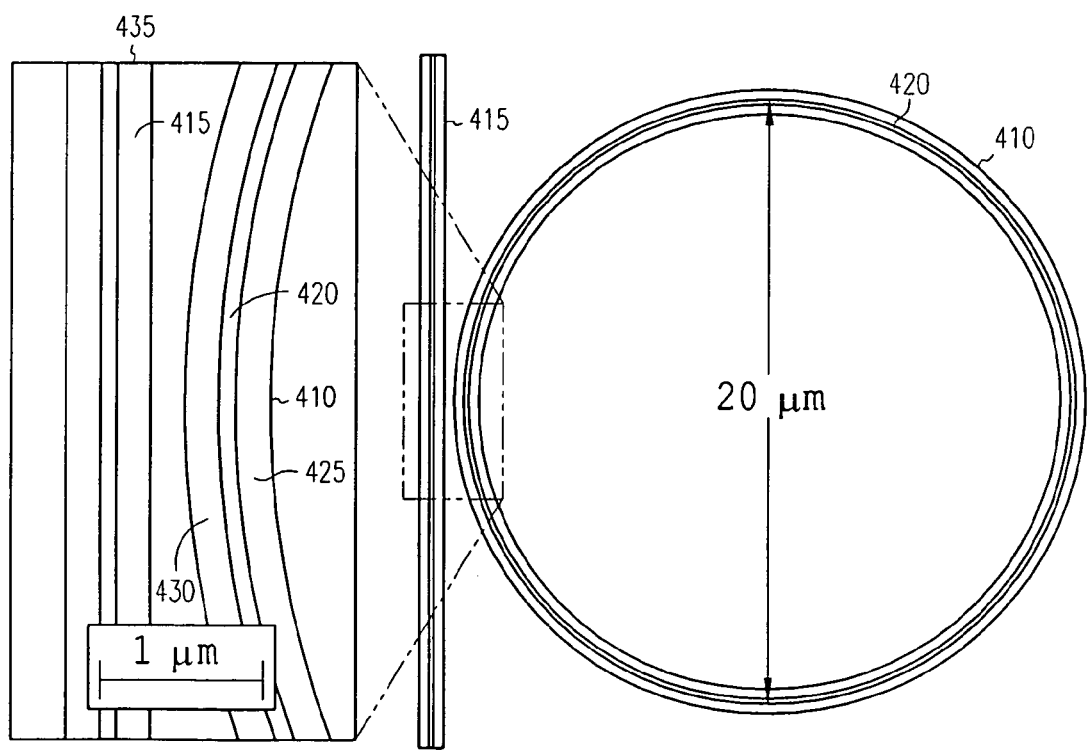
FIG. 4 is a top view of a slot ring resonator according to an example embodiment.

FIG. 4 is a plan view of a slot ring resonator 410 optically coupled to a straight slot waveguide 415. In one embodiment, the ring resonator is a slot waveguide that is formed in a circle. The slot is seen at 420, and is sandwiched between two higher refractive index portions 425 and 430. An expanded view of a portion of the interface between ring resonator 410 and 415 is shown at 435. The slot-waveguide can be implemented as a compact device for highly integrated photonics, due to its strong confinement nature. In one embodiment, a ring resonator with a bending radius of 5 µm may result in a transmission in a 360 degree turn of 99.2%. Such low propagation bending losses potentially translate into ring resonators with a quality factor of at least about Q=20,000.

Figure 5:
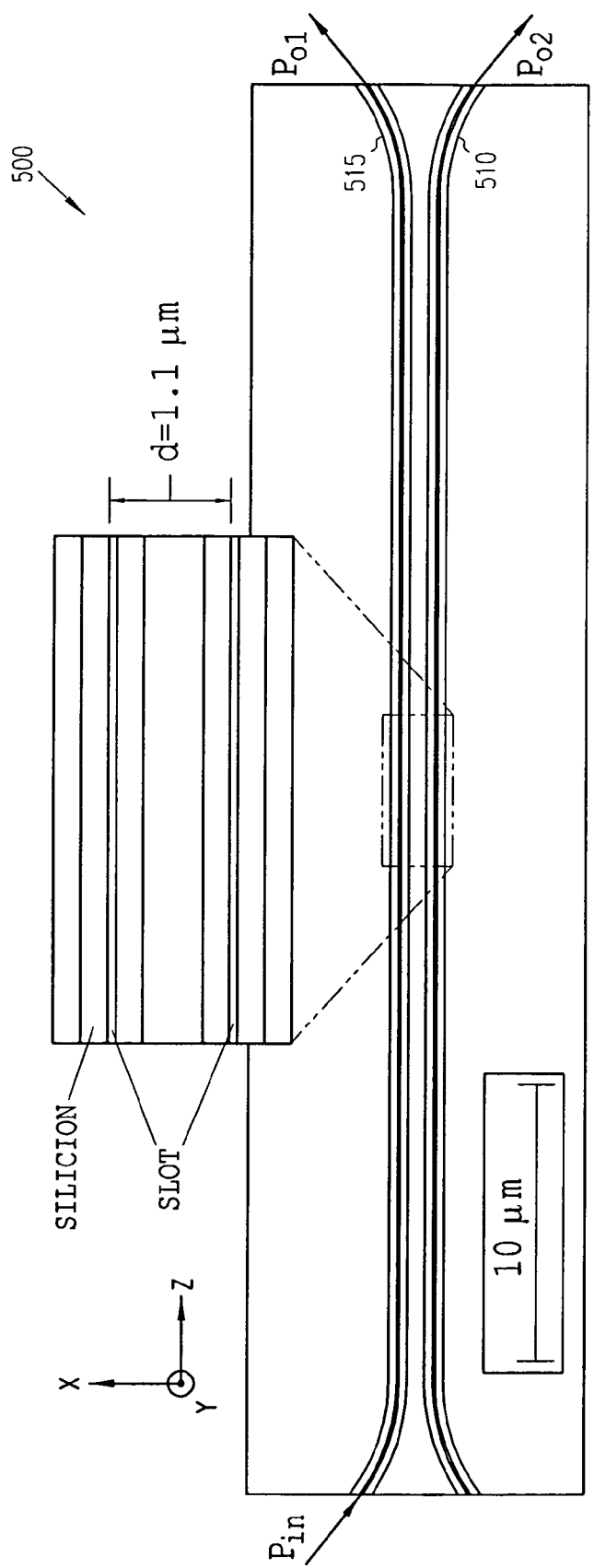
FIG. 5 is a top view of a directional coupler according to an example embodiment.

FIG. 5 is a top-view SEM picture of a directional coupler 500 formed by two parallel slot-waveguides 510 and 515, fabricated on an SOI platform prior to deposition of cladding. Directional couplers composed of two parallel slot-waveguides with separation distance d, which then diverge at each end for coupling to further optical devices if desired. In one embodiment, d is approximately 1.1 µm, and provides sufficient optical coupling of the waveguides. The coupling coefficient κ is proportional to the overlap of the electric field of both slot-waveguides. Therefore, the decay rate γ is related to the coupling coefficient κ of two parallel slot-waveguides as $κ(d) \propto \exp(-γ \cdot d)$. The coupling coefficient is in turn related to the power ratio K between the output power of slot-waveguide 2 ($P_{O2}$) and the input power of slot-waveguide 1 ($P_i$); hence, $K(d)=P_{o2}/P_{in}=\sin^2[κ(d) \cdot L]$, where L is the length of the directional coupler. Therefore, $$ln\ κ(d)=ln[\arc\sin(\sqrt{K(d)}/L]=-γ \cdot d+C \qquad (2),$$

where C is a constant independent of d. The decay rate γ and therefore the effective index $n_{eff}$, can then be obtained from experimentally measured K-versus-d relationship with a linear fit. The power-coupling ratio K was measured on example experimental devices having different d values at a wide spectral range for both quasi-TE and quasi-TM modes to obtain dispersion curves shown in FIG. 6.

Figure 6:
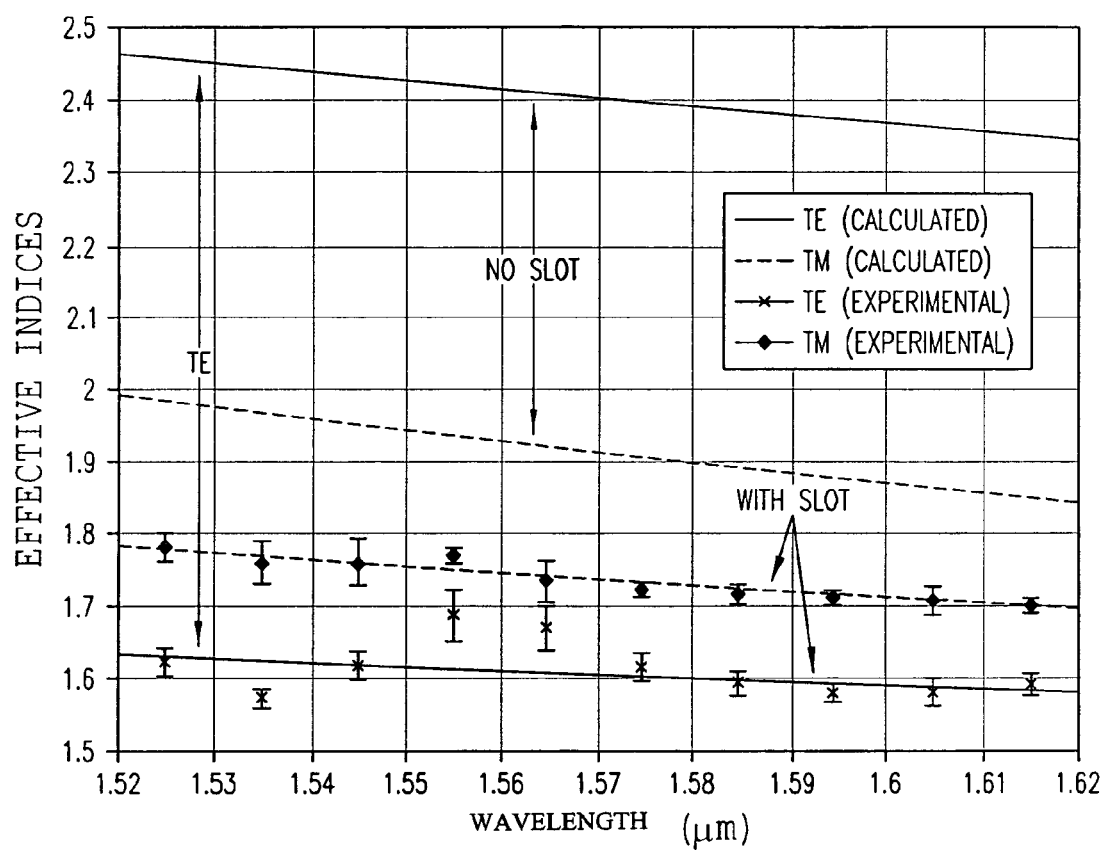
FIG. 6 is a graph of dispersion curves for different modes according to an example embodiment.

Experimental results of the dispersion curves for both the quasi-TE mode and the quasi-TM mode are shown in FIG. 6, (crosses and diamonds, respectively). The simulated dispersion curves obtained with a full-vectorial finite difference mode solver (solid line for quasi-TE mode and dashed line for quasi-TM mode) are also shown. There appears to be good agreement between simulated and experimental results. The simulated dispersion curves of equivalent conventional channel waveguides, i.e. $w_s=0$, are also shown in FIG. 6 (solid and dashed lines for quasi-TE and quasi-TM modes, respectively). When no slot is present, the effective index of the quasi-TE mode ($n_{eff}$~2.4) is much higher than that of the quasi-TM mode, indicating that the power of the quasi-TE mode is mostly confined in the silicon core. When the slot is introduced, a strong decrease in the effective index of the quasi-TE mode is measured ($n_{eff}$~1.6), whereas the effective index of the quasi-TM mode is only slightly affected. This behavior illustrates that the optical power is concentrated in the low-index region, likely due to the field discontinuity.

Figure 7:
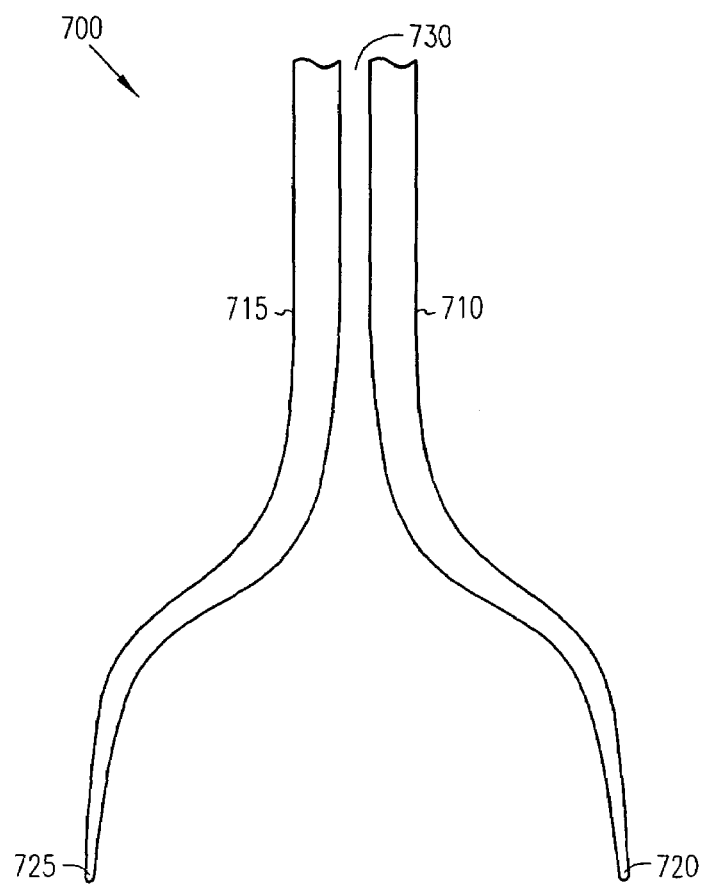
FIG. 7 is a representation of a double tip waveguide coupler according to an example embodiment.

A double tip waveguide coupler is shown at 700 in FIG. 7. Two rails of high refractive index materials 710 and 715 run substantially parallel, and diverge into two spaced apart tips 720 and 725. The tips may be placed on an end of a waveguide, which is generally much larger than the tips, to transfer light between the rails and the waveguide. The rails in one embodiment, are spaced apart by a gap 730 of lower refractive index, essentially forming a slot waveguide opposite the tips 720 and 725. This provides the ability to transfer light from a waveguide to an integrated circuit chip having a slot waveguide with high refractive indexes diverging to suitably spaced tips. The spacing of the tips provides good overlap between mode profiles of the fiber and the tips. U.S. patent application Ser. No. 10/346,730 for High-Index Contrast Waveguide Coupler, filed Jan. 17, 2003 is hereby incorporated by reference for its teaching of waveguide couplers.

Figures 9A, 9B, 9C, 9D:
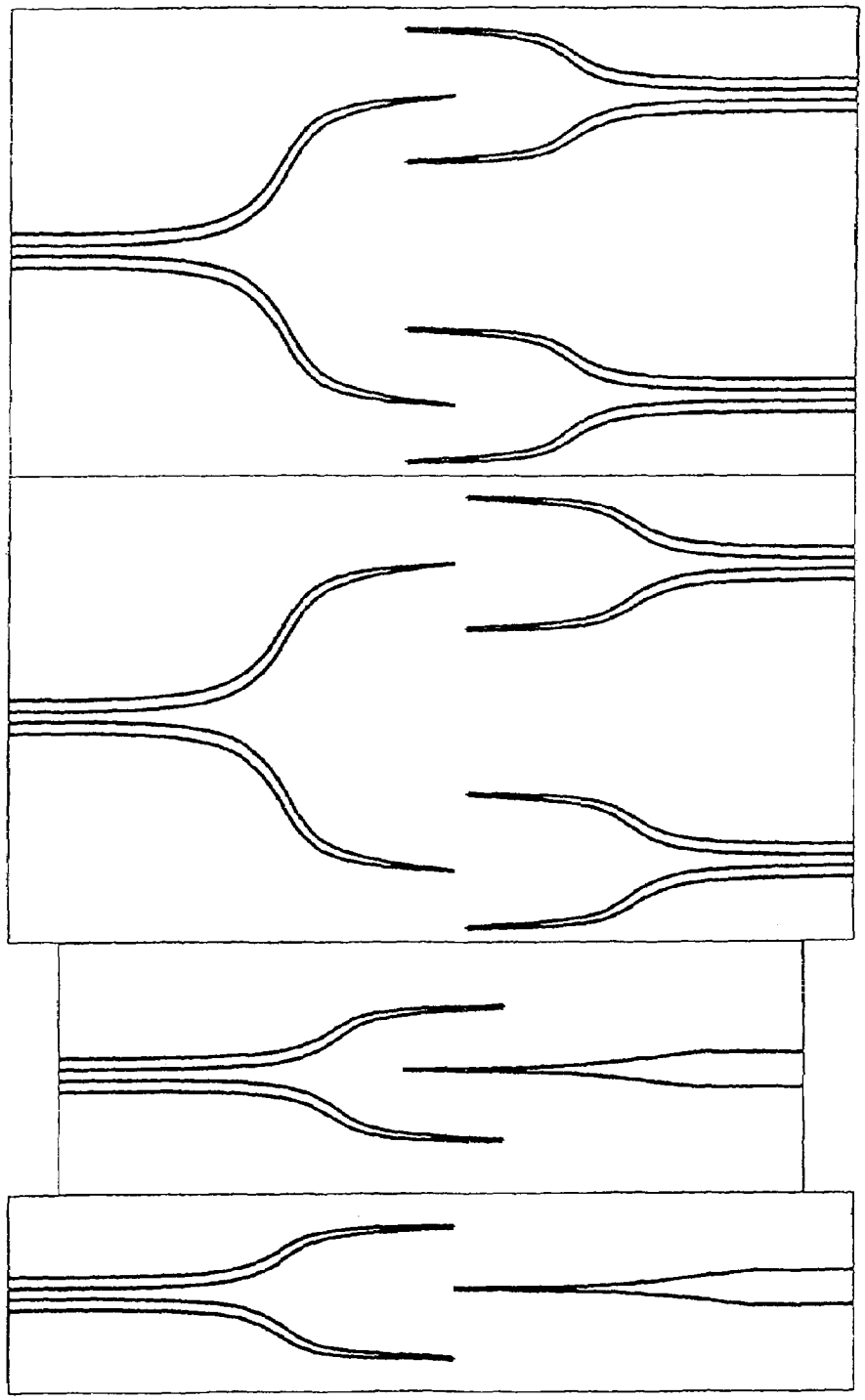
FIGS. 9A, 9B, 9C, 9D, 9E, 9F and 9G are cross-sectional representations of further couplers according to various example embodiments.
Figure 9:
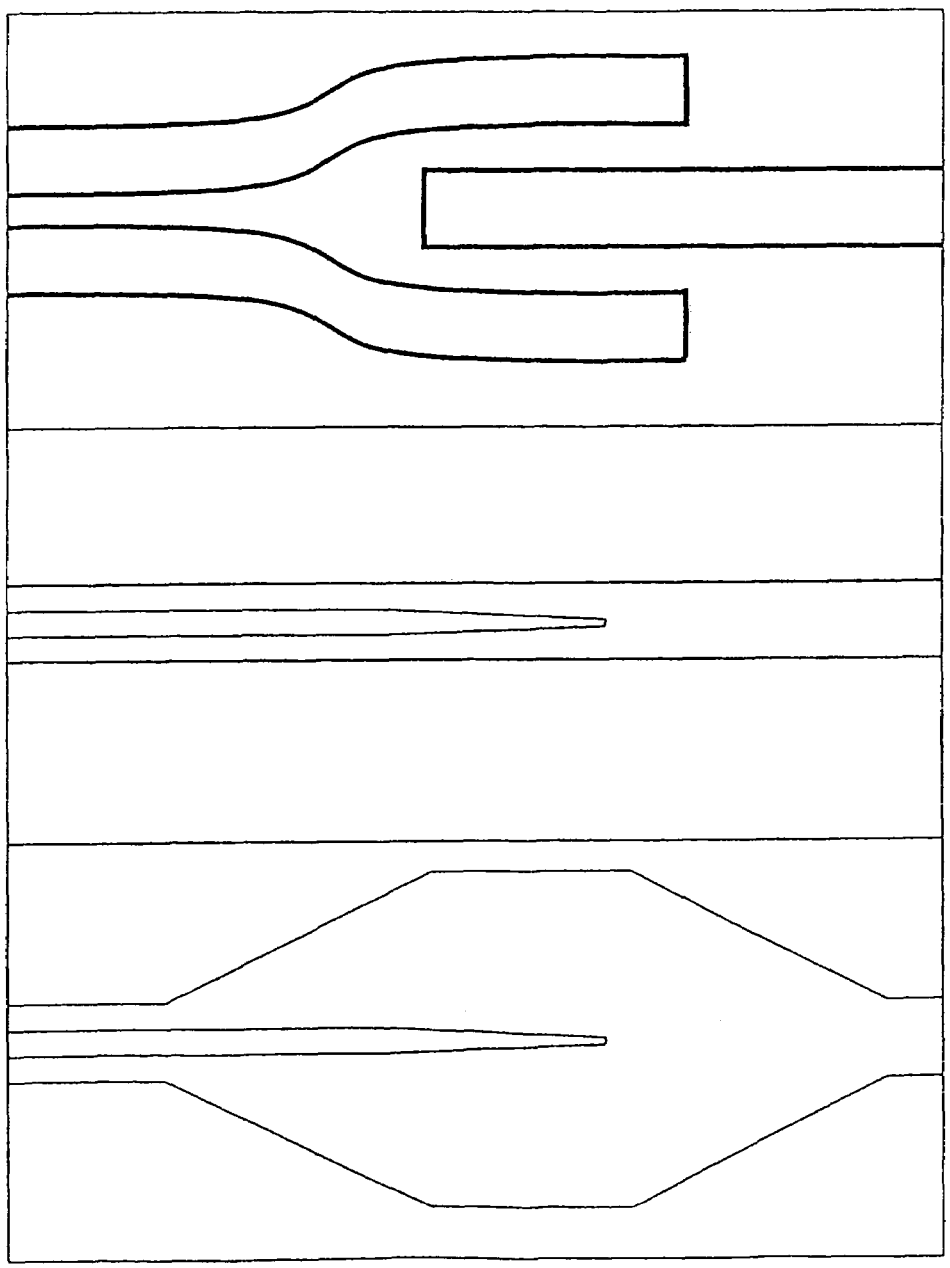

FIGS. 9A, 9B, 9C, 9D, 9E, 9F and 9G are cross-sectional representations of further couplers utilizing variations of slot waveguides and tapered waveguides. FIGS. 9A and 9B show a single slot waveguide that separates into two tapering areas of high index of refraction coupled to two other slot waveguides. FIG. 9B. FIGS. 9C and 9D show a slot waveguide that separates into two tapering areas of high index of refraction coupled to a tapered portion of a waveguide. FIG. 9E shows a slot waveguide that separated into two areas of high index of refraction coupled to a single waveguide. FIG. 9E shows a tapered waveguide extending into a waveguide. FIG. 9G shows a tapered waveguide extending into an enlarged portion of a waveguide. Each of these couplers may be surrounded by a cladding of low index of refraction material or air.

Figure 8:
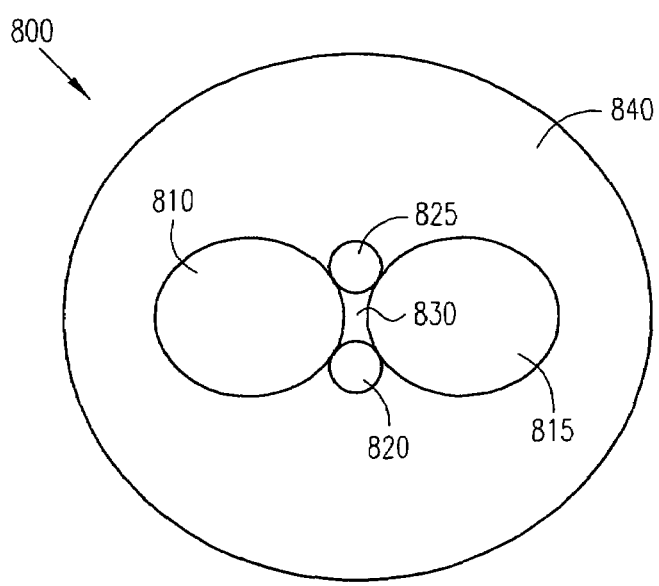
FIG. 8 is a cross-sectional representation of a further slot waveguide structure according to an example embodiment.

Yet a further slot waveguide structure is shown generally at 800 in FIG. 8. Two circular rods 810 and 815 of high refractive index material form rails in structure 800. Two low refractive index spacer rods 820 and 825 are disposed adjacent the rods 810 and 815 and are spaced apart to provide a void 830 between the rails and rods. The void 830 corresponds to a low refractive index slot. The rails and rods may be surrounded by a cladding 840 in one embodiment provided by a CVD fill, which also may have a low refractive index.

The slot waveguide structures described herein provide a geometry for guiding and confining light in a low index region. Slot waveguides produce high E-field amplitude, optical power and optical intensity in low-index materials on levels that may not be achievable with conventional waveguides. This property enables highly efficient interaction between fields and active materials, which facilitates all-optical switching and parametric amplification on integrated photonics. A strong E-field confinement is localized in a nanometer-sized low-index region, which may be filled with low-index materials, including fluids such as liquids or gases. Therefore, the slot-waveguide can be used to greatly increase the sensibility of compact optical sensing devices or to enhance the efficiency of near-field optical probes. Optical power can be confined to the low-index material by using the slot-waveguide configuration, opening the opportunity for guiding and confining in novel materials without the traditional constraint of transmission in high refractive index materials. The slot-waveguide structures can be integrated on silicon chips, enabling very compact optical sensing, optical amplification, and optical switching devices to be monolithically integrated with electronic circuits.

The slot waveguide structures may be formed with or without top or bottom cladding. In other words, two slabs of high refractive index material may be spaced apart without cladding. The low refractive index area between the slabs may be solid or fluid, such as liquid or gas, or simply a void. The structures include slot ring resonators, directional couplers, double tip couplers for use in obtaining light from a fiber or other structure into a slot waveguide structure, or yet other structures.

In some embodiments, structures may be placed in the slots of slot waveguide structures. Quantum dots or CU dots may be excited, or read by placing them proximate or in the slot of a slot waveguide. Slots may also be used for sensing gases, liquids, bio-agents, bio-labels, etc as well as for exciting plasmon waveguides/structures, or other nanometer scale structures of interest. Coupling may also be made to nanometallic plasom particle waveguides.

In further embodiments, multiple alternating layers of low and high index material may be used to create multiple integrated slot waveguides. Slot waveguides having "U" shaped cross sections may also be provided. In one embodiment, a bottom, high index, layer may be thinner than lateral walls in order to keep a strong slot-effect. Such structures may be useful for nanofluidic applications.

In still further embodiments, modifying the size of the slot, such as by bending one or both of the high refraction index materials provides on/off switching for about only 10 nm of width variation. A very low voltage may be utilized in a Mach-Zehnder configuration to achieve such switching. Additionally, just varying slot width allows strong modulation of the effective index (phase modulator), polarization mode dispersion (PMD), and/or group velocity dispersion (GVD).

The slot waveguide structures are also useful in near-field scanning optical microscopy (NSOM). A tip-slot width can be modified, such as electrically, in order to better conform resolution to a specimen, or to implement a lock-in NSOM measurement. One application is heat or light assisted magnetic recording utilizing the gap between the magnetic read head and recording media.

In further embodiments, a non-linear material may be used in the slot area. Er or other amplifying material may also be used. In yet further embodiments, separate control of the effective refractive index and therefore phase in a Mach-Zehnder with one suspending or otherwise tuned arm of the slot in one half of the Mach-Zehnder interferometer.

The Abstract is provided to comply with 37 C.F.R. § 1.72(b) to allow the reader to quickly ascertain the nature and gist of the technical disclosure. The Abstract is submitted with the understanding that it will not be used to interpret or limit the scope or meaning of the claims.

The invention claimed is:

1. A light guiding structure comprising:
   a pair of high refractive index regions spaced apart to form a nanometer order gap having a low refractive index adapted to operate as a waveguide by concentrating optical power in the gap and propagating the optical power along a length of the gap.

2. The light guiding structure of claim 1 wherein the gap separates the high index regions by between approximately 10 nanometers and 200 nanometers.

3. The light guiding structure of claim 1 wherein the high refractive index regions have an index of refraction of approximately at least 3.48, and the low refractive index gap has an index of refraction of approximately at most 1.46.

4. The light guiding structure of claim 1 wherein the respective refractive indices provides strong optical confinement in the gap.

5. The light guiding structure of claim 1 wherein the mode of light propagation comprises Eigenmodes.

6. The light guiding structure of claim 1 and further comprising a cladding, covering surfaces of the high index regions.

7. The light guiding structure of claim 1 wherein a high refractive index contrast between the high refractive index regions and the low refractive index gap provides an electric field discontinuity between the regions and strong light confinement and optical intensity in the low refractive index gap.

8. The light guiding structure of claim 7 wherein the electric field where the high refractive index regions and low refractive index gap meet, is higher at the low-index side and lower at the high-index side, with an electric field ratio equal to the square of the index contrast $(n_{High}/n_{Low})^2$.

9. The light guiding structure of claim 1 wherein the low refractive index gap comprises a non-linear optical material.

10. A light guiding structure comprising:
    a substrate;
    an insulating layer supported by the substrate;
    a pair of high refractive index regions supported by the insulating layer and spaced apart to form a nanometer order gap having a low refractive index adapted to form a waveguide such that light is propagated along the gap; and
    a cladding formed on top of the high refractive index regions.

11. The light guiding structure of claim 10 wherein the cladding has a low refractive index.

12. The light guiding structure of claim 11 wherein the gap contains cladding.

13. The light guiding structure of claim 10 wherein a high refractive index contrast between the high refractive index regions and the low refractive index gap provides an electric field discontinuity between the regions and gap and strong light confinement and optical intensity in the low refractive index gap.

14. The light guiding structure of claim 13 wherein the electric field where the high refractive index regions and low refractive index gap meet is higher at the low-index side and lower at the high-index side, with an electric field ratio equal to the square of the index contrast $(n_{High}/n_{Low})^2$.

15. The light guiding structure of claim 10 wherein the distance of the gap between high refractive index regions is smaller if high intensity is desired, and may be larger if more power in the low-index layer is preferred.

16. The light guiding structure of claim 15 wherein the distance of the gap between high refractive index regions is smaller than the wavelength of optical waves to be transmitted in the gap.

17. The light guiding structure of claim 15 wherein the thickness of the high-refractive-index layers is comparable to half of the wavelength.

18. The waveguide of claim 10 wherein the gap comprises a non-linear optical material.

19. A light guiding structure comprising:
    a high refractive index region containing a nanometer order gap having a low refractive index; and
    a low refractive index region around the high refractive index region such that light is propagated in the gap.

20. The waveguide of claim 19 wherein the high refractive index region and gap are substantially circular in shape.

21. The waveguide of claim 20 wherein the high refractive index region and gap are substantially concentric.

22. The light guiding structure of claim 19 wherein a high refractive index contrast between the high refractive index region and the low refractive index gap provides an electric field discontinuity between the regions and gap and strong light confinement and optical intensity in the low refractive index gap.

23. The light guiding structure of claim 19 wherein the gap comprises a non-linear optical material.

24. An optical resonator comprising:
    a pair of high refractive index regions spaced apart by a nanometer range low refractive index gap in a substantially circular shape, forming a continuous slot waveguide such that light is propagated in the gap.

25. The waveguide of claim 24 wherein the mode of light propagation comprises Eigenmodes.

26. The waveguide of claim 24 and further comprising a cladding, covering surfaces of the high index regions.

27. The waveguide of claim 24 wherein a high refractive index contrast between the high refractive index regions and the low refractive index gap provides an electric field discontinuity between the regions and strong light confinement and optical intensity in the low refractive index gap.

28. The waveguide of claim 27 wherein the electric field where the high refractive index regions and low refractive index gap meet, is higher at the low-index side and lower at the high-index side, with the ratio equal to the square of the index contrast $(n_{High}/n_{Low})^2$.

29. The resonator of claim 24 and further comprising a substantially straight waveguide positioned adjacent the circular high refractive index regions and optically coupled thereto.

30. The resonator of claim 29 wherein the substantially straight waveguide comprises a slot waveguide.

31. A directional optical coupler comprising:
a first slot waveguide having regions of high refractive index separated by a low refractive index gap that concentrates optical power in the gap; and
a second slot waveguide having regions of high refractive index separated by a low refractive index gap that concentrates optical power in the gap, wherein the first and second slot waveguides are substantially parallel and optically coupled for a desired distance, and wherein they diverge at at least one end.

32. An optical coupler comprising:
two rails of high index of refraction material running substantially parallel and separated by a low refractive index gap that concentrates optical power in the gap, wherein the rails diverge into two laterally spaced apart tips, the tips separated by a distance adapted for mode matching with an optical fiber having larger dimensions than the rails.

33. A waveguide comprising:
two rails of high index of refraction material running substantially parallel;
a pair of spacer rods positioned adjacent the rails, and separating the rails to form a gap of low index of refraction material that concentrates optical power in the gap.

34. The waveguide of claim 33 and further comprising a low index of refraction cladding surrounding the rails.

35. The waveguide of claim 1 wherein the pair of high refractive index regions run substantially parallel to each other to guide light in an Eigenmode propagation.

36. The waveguide of claim 1 wherein the pair of high refractive index regions run substantially parallel to each other to guide light strongly confined along the gap.

37. The waveguide of claim 10 wherein the pair of high refractive index regions run substantially parallel to each other to guide light in an Eigenmode propagation.

38. The waveguide of claim 10 wherein the pair of high refractive index regions run substantially parallel to each other to guide light strongly confined along the gap.

* * * * *